United States Patent [19]

Cheng

[11] Patent Number: 5,197,858
[45] Date of Patent: Mar. 30, 1993

[54] THERMAL CONTROL VARIABLE SPEED DC BRUSHLESS FAN

[75] Inventor: Rex Cheng, Taoyuan, Taiwan

[73] Assignee: Delta Electronics, Inc., Taiwan, Taiwan

[21] Appl. No.: 780,984

[22] Filed: Oct. 23, 1991

[51] Int. Cl.⁵ ............................................. F04D 27/02
[52] U.S. Cl. ........................................ 417/14; 318/473; 388/934; 417/32
[58] Field of Search ................... 417/32, 14; 318/473, 318/472, 471; 388/934

[56] References Cited

U.S. PATENT DOCUMENTS

| | | | |
|---|---|---|---|
| 3,544,236 | 12/1970 | Brookmire | 417/45 |
| 4,506,199 | 3/1985 | Asche | 318/473 X |
| 4,535,275 | 8/1985 | Muller | 318/254 |
| 4,609,854 | 9/1986 | Yamamoto et al. | 318/471 |
| 4,620,139 | 10/1986 | Egami et al. | 318/254 |
| 4,644,238 | 2/1987 | Hirosaki | 318/473 X |
| 4,722,669 | 2/1988 | Kundert | 417/32 |
| 4,806,832 | 1/1989 | Muller | 318/471 X |

Primary Examiner—Leonard E. Smith
Attorney, Agent, or Firm—Bacon & Thomas

[57] ABSTRACT

A thermal control variable speed DC brushless fan, especially a DC brushless fan which may change speed in accordance with the temperature sensed, includes a fan speed control circuit and a DC brushless fan. The fan speed control circuit is composed of drive ICs, operation amplifiers, transistors, diodes, capacitors resistors, and a thermal sensor. Under normal conditions, the change in the fan's rotation speed relation to the temperature is almost linear, but when the thermal sensor is open or shorted the speed control circuit of the fan causes the fan to operate at full speed to maintain a cooling effect.

7 Claims, 4 Drawing Sheets

THERMAL CONTROL VARIABLE SPEED DC BRUSHLESS FAN

BACKGROUND OF THE INVENTION

1. Field of the Invention

The present invention relates to a thermal control for variable speed DC brushless fans, and in particular to a fan in which the variable speed is normally dependent on temperature alteration and in which the fan is operated at full speed when the thermal sensor malfunctions in order to protect computer systems and the like which require constant cooling.

2. Description of the Related Art

Computer systems have become popular auxiliary facilities in houses, factories, offices and the like where work is performed. In order to improve quality of life generally, the quality of the working environment must be improved. For example, the noise produced upon operating of a fan concerns both operators of the fan and the manufacturers. Nevertheless, fans are essential elements for dissipation of heat from computer systems and various equipment thereof. The cooling fan of the present invention is designed with these considerations in mind.

While the computer is at full load, the conventional constant speed fan is operated at full speed, but while the computer is not at full load, the conventional constant speed fan still maintains full speed operation and a high noise level. In contrast, in the cooling fan of the present invention, while the computer is not at full load and the inside temperature is low, a temperature sensor will sense the alteration of temperature and change its resistance, thereby feeding back to the control circuit a signal which slows down the speed of the fan to just accommodate the temperature range required. As a result, noise from the fan will be cut down and the service life of the fan lengthened.

SUMMARY OF THE INVENTION

Thus, a principal objective of the present invention is to provide a thermally controlled variable speed direct current brushless fan which has a speed control circuit consisting of a driving IC, operation amplifiers, transistors, diodes, resistors, capacitors, a thermal sensor and other elements, to thereby linearly change the speed of the fan in accordance with variations in environmental temperature.

Further, according to an especially preferred embodiment of the present invention, when the thermal controller is open or short, the fan speed control circuit will automatically initiate full speed operation of the fan in order to achieve the function of protection for heat sensitive equipment, achieving another object of the present invention.

A more complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENTS

Figure 1:
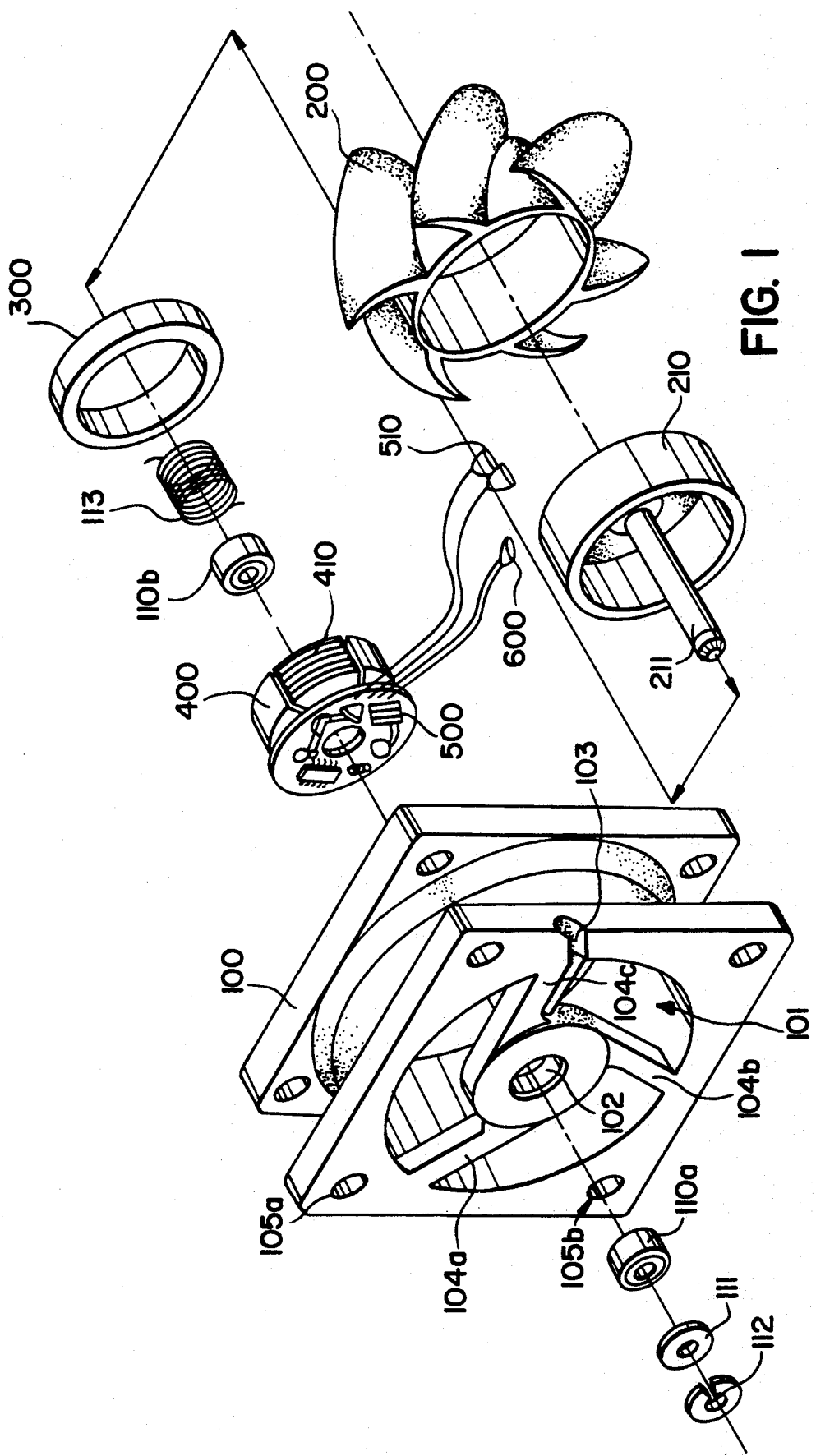
FIG. 1 is an exploded perspective view showing disassembly of a fan constructed in according to principles of a preferred embodiment of the present invention.

As shown in FIG. 1, a preferred embodiment of the inventive fan comprises a frame 100 having a housing 101 to contain an impeller 200, and three crutches 104a, 104b and 104c to support an axle bush 102 for containing a shaft 211 and two bearings 110a and 110b. The axle bush 102 is assembled with a P.C. board 500 and a stator 400 soldered on the P.C. board 500. Wires 510 and thermal sensor 600 exit housing 101 through a groove 103 in crutch 104c.

A metal case 210 is surrounded by impeller 200 and a magnet 300 is inserted into the case 210. A shaft 211 fixed in metal case 210 or impeller 200 extends through spring 113, bearing 110b inserted into axle bush 120, stator 400, P.C. board 500, and bearing 110a. Washer 111 and container 102 cause the rotation shaft 211 to be situated in the center of housing 101. The outer portion of the rotation shaft 211 is encircled by washer 111 and secured with a fastener 112 to form the cooling fan.

Figure 2:
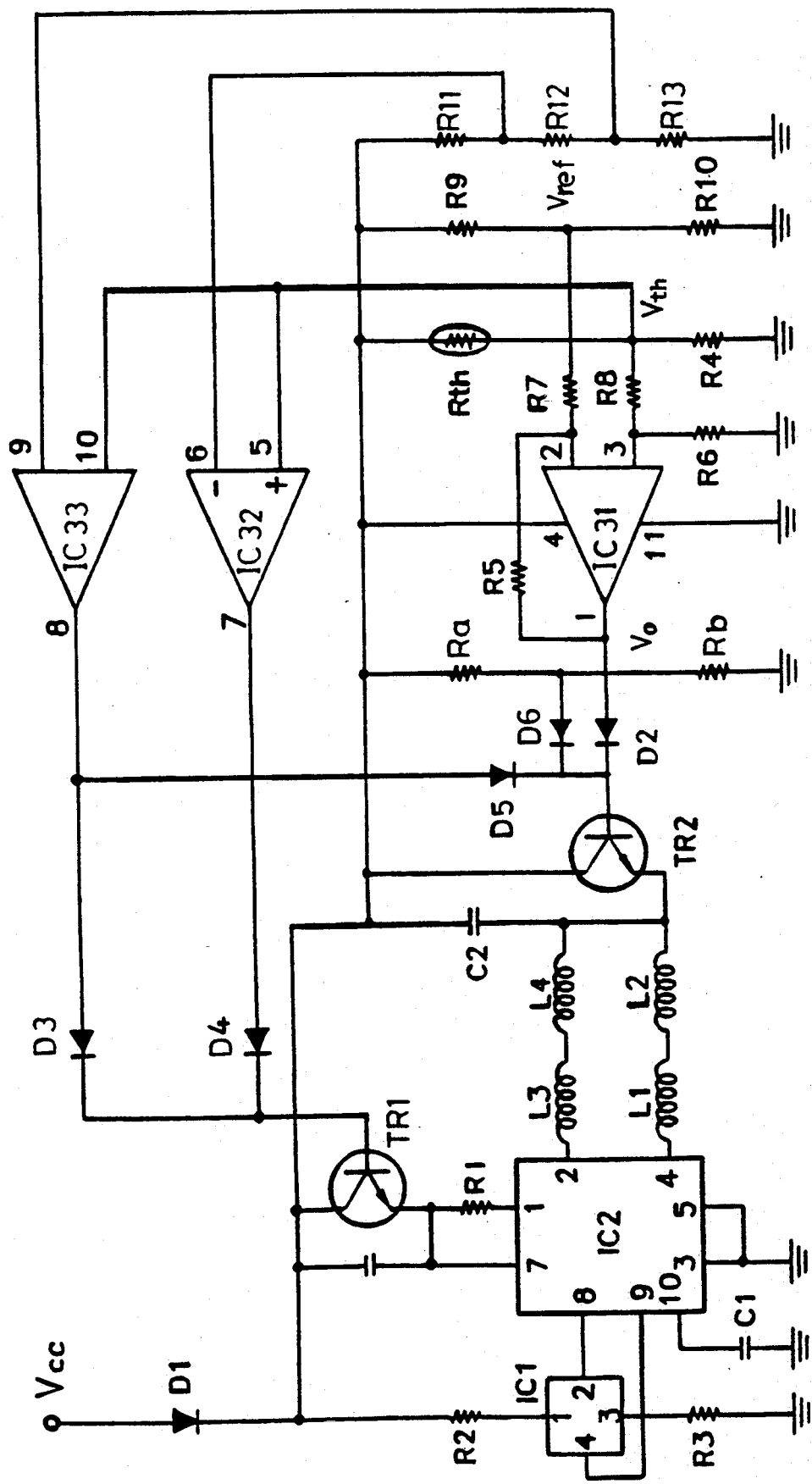
FIG. 2 is a circuit diagram of a controller for the fan shown in FIG. 1, also constructed in accordance with the inventive principles of the preferred embodiment.
Figure 5:
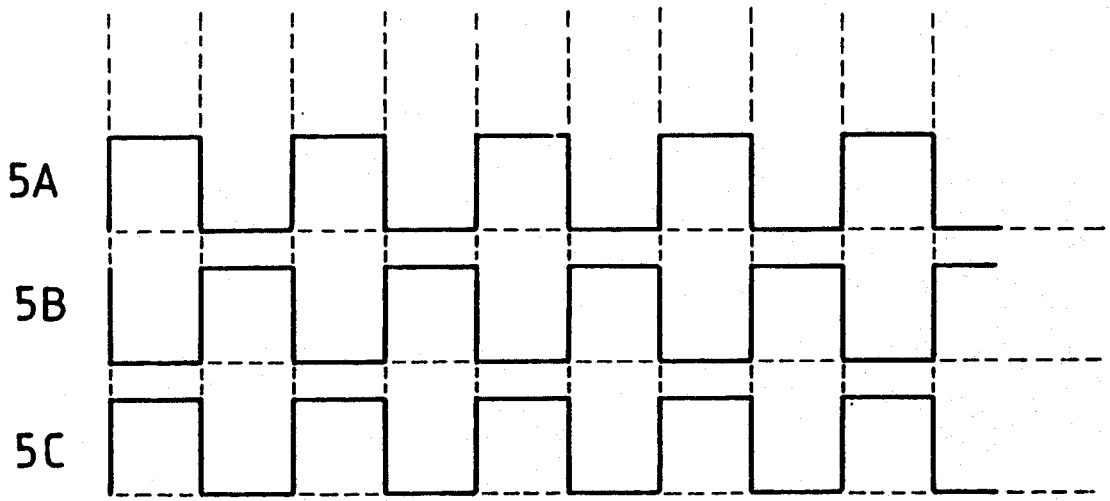
FIG. 5 is a chart showing output waveforms for the drive IC of the circuit of FIG. 2.

FIG. 2 is a diagram of a preferred speed control circuit. When the power is on, via an inverse voltage protection diode D1, impellers 200 start to rotate by the mutual induction between winding coils 410 and magnet 300. At this time, a Hall element IC1 senses the variation of magnetic field between winding 410 (FIG. 1), represented in FIG. 2 as windings L1 to L4, and magnet 300 (also FIG. 1) to cause the DC brushless motor to commute as follows: A predetermined current and DC level are supplied by resistors R3, R2. Positive (V+) and negative (V−) voltages are both output from a Hall element IC1 to a driving IC IC2. The two voltage waveforms can be shaped by means of the driving IC IC2 by comparing them with an internal voltage to obtain the waveform shown in FIG. 5A. This waveform controls semiconductor switches 01, 02 to obtain the waveform shown as FIGS. 5B, 5C. Motor windings L1, L2 and L3, L4 (i.e., winding 410) are controlled by the wave output from the semiconductor switches 01, 02 to commutate in accordance with the magnetic couple with magnet 300. The capacitor C1 provides voltage to the driving IC IC2 for re-starting of the motor from a completely motionless state of the fan. As a result, a driving system composed of IC1 and IC2 can drive the fan and output a cycle-timing pulse signal.

IC3 comprises three internal operational amplifiers (op amps) IC31, IC32, IC33. Op amp IC31, with resistors R4, R5, R6, R7, R8, R9, R10 and a thermal sensor Rth (sensor 600 of FIGS. 4 and 5) in combination, forms a control circuit for the slope of the curve of the speed versus the temperature of the thermal control variable speed fan. Because the resistance value of the thermal sensor Rth changes with temperature, the voltage Vth which is dependent upon the resistance of sensor Rth and resistor R4 will also be changed as the temperature changes. Voltage Vth and the reference voltage vref, which is controlled by the voltage divider formed by resistors R9 and R10, are input into op amp IC31, to obtain a variable voltage Vo, which causes the collector current of transistor TR1 to change accordingly, changing the speed of the fan. Therefore, the object of variable speed by thermal control is achieved.

A stop circuit is composed of op amp IC 32, which is responsive to a voltage drop across the thermal sensor, resistors R1, R11, R12, R13, and transistor TR1. The resistors R11, R12 & R13 can be selected as required to stop variable speed operation at any desired speed and instead maintain a minimum rotational speed, for example a speed which is ⅓ of the highest speed.

Op amp IC33 in combination with resistors R11, R12, R13 form a malfunction detection and control circuit which is also responsive to the voltage drop across the thermal resistor. When the thermal sensor Rth is open, a conventional fan would cease to operate for lack of a voltage supply. Failure of the fan to work would probably cause the computer equipment being cooled to fail as a result of overheating. However, in the preferred circuit, if thermal sensor Rth is open as a result of a malfunction, the resulting voltage change across the inputs of op amp IC33 causes it to output a signal to the base of transistor TR1 and, via transistor TR2, the fan is thereby driven to operate at full speed to prevent failure of the protected computer equipment.

Figure 3:
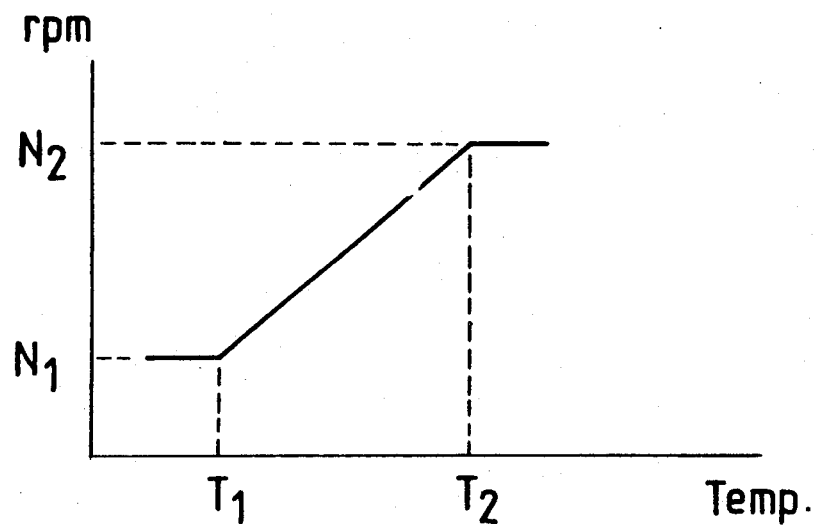
FIG. 3 is a graph showing a curve of temperature versus speed for the preferred fan.

FIG. 3 is a graph showing the curve of temperature versus speed for the fan of the above-described preferred embodiment. It can be seen from this figure that, within a certain temperature range (T1 to T2), the speed (rpm) of the fan can rise almost linearly (N1 to N2). In this manner, the objective of regulating the slope variation point of the curve of temperature versus speed by means of changing the resistance value of each of resistors R4, R5, R6, R7, R8, R9, and R10 is achieved.

Figure 4A:
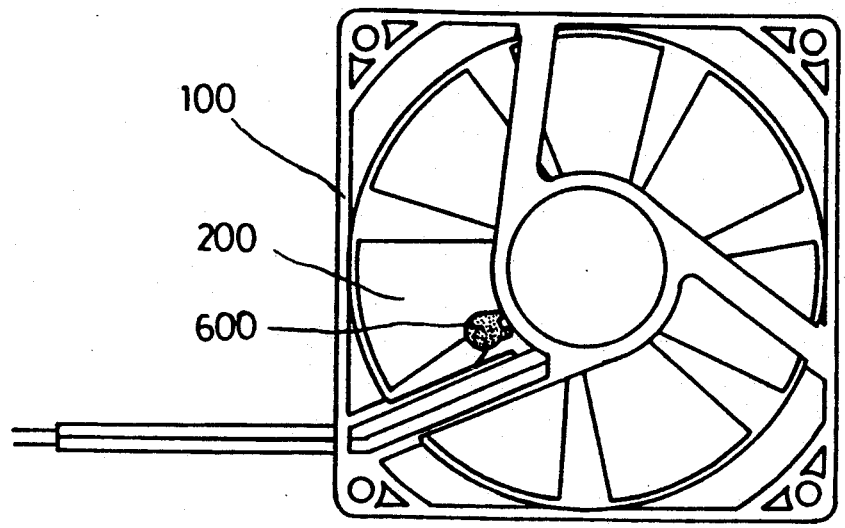
FIGS. 4A and 4B are plan views showing the position of a thermal sensor in the fan of FIG. 1.
Figure 4B:
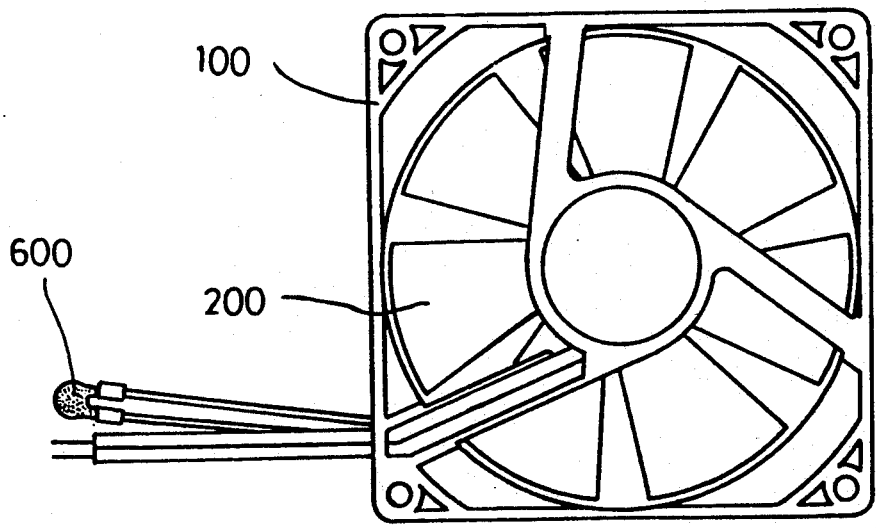

FIGS. 4A and 4B show the position on the fan of the thermal sensor of the invention. When the thermal sensor 600 adjoins the frame, as shown in FIG. 4A, the outlet temperature can be sensed directly, while when the thermal sensor 600 is connected externally by wires, as shown in FIG. 4B, the best cooling control effect can be obtained by installing the sensor 600 at the hot spot of the system and/or by sensing the ambient temperature.

In summary, the thermally controlled variable speed DC brushless fan of the invention provides variable speed operation under thermal control in order to decrease the noise generated by the fan while also providing a protective cooling effect even when the thermal speed control sensor malfunctions, eliminating the disadvantages of conventional fixed and variable speed fans.

Although the present invention has been described with a certain degree of particularity, the present disclosure has been made by way of example and changes in details of structure may be made without departing from the spirit thereof.

I claim:

1. A variable speed fan, comprising:
   an impeller;
   a thermal sensor;
   means responsive to the thermal sensor for rotating the impeller at a speed which varies in response to changes in temperature sensed by the sensor;
   means for detecting a malfunction in the sensor;
   means for causing high-speed operation of the fan in response to detection of the malfunction.

2. A variable speed fan as claimed in claim 1, wherein the thermal sensor is provided on the fan to thereby sense temperature adjacent the fan.

3. A variable speed fan as claimed in claim 1, wherein said thermal sensor is positioned away from the fan to sense ambient temperature.

4. A variable speed fan as claimed in claim 1, wherein said impeller rotation means comprises a pulse-driven DC brushless motor and a motor speed control circuit, the speed at which the motor is driven being varied in response to changes in a voltage drop across the thermal sensor caused by temperature-related changes in a resistance of the sensor.

5. A variable speed fan as claimed in claim 4, wherein said malfunction detection means comprises a circuit arranged to output a signal to said motor speed control circuit in response to a change in said voltage drop which indicates a malfunction, said signal causing said speed to increase to a maximum speed.

6. A variable speed fan as claimed in claim 1, further comprising means for maintaining a minimum speed when the temperature drops below a predetermined level.

7. A variable speed fan as claimed in claim 6, wherein said impeller rotation means comprises a pulse-driven DC brushless motor and a motor speed control circuit, the speed at which the motor is driven being varied in response to changes in a voltage drop across the thermal sensor caused by temperature-related changes in a resistance of the sensor, and wherein said minimum speed maintaining means comprises a circuit arranged to output a signal to said motor speed control circuit in response to a change in said voltage drop which indicates a predetermined temperature has been reached, said signal causing said speed to be maintained until the temperature rises above the minimum temperature.

* * * * *